United States Patent
Feile et al.

[11] Patent Number: 6,149,199
[45] Date of Patent: *Nov. 21, 2000

[54] BELT BUCKLE WITH A TRACTION CABLE ATTACHED THERETO

[75] Inventors: Herbert Feile, Schwäbisch Gmünd, Germany; Albert Kinzel, Abersee, Austria

[73] Assignee: TRW Occupant Restraint Systems GmbH, Aldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/019,094

[22] Filed: Feb. 5, 1998

[30] Foreign Application Priority Data

Feb. 6, 1997 [DE] Germany ............ 297 02 077 U

[51] Int. Cl.⁷ ........................................ B60R 21/00
[52] U.S. Cl. ............ 280/801.1; 97/468; 24/265 BC
[58] Field of Search .............. 280/801.1; 297/468, 297/482; 24/265 BC, 633, 641

[56] References Cited

U.S. PATENT DOCUMENTS

| 4,150,843 | 4/1979 | Reid et al. ............... 280/801.1 |
| 4,157,841 | 6/1979 | Bergman et al. ............ 297/482 |
| 4,199,190 | 4/1980 | Lindblad ................. 297/468 |
| 4,611,854 | 9/1986 | Pfeiffer ................. 297/468 |
| 4,645,231 | 2/1987 | Takada ................. 280/801.1 |
| 4,674,801 | 6/1987 | DiPaola et al. ............ 297/468 |
| 4,822,104 | 4/1989 | Plesniarski ............. 297/468 |
| 4,915,451 | 4/1990 | Forget et al. ............ 297/468 |
| 5,141,352 | 8/1992 | McManus et al. ............ 297/468 |
| 5,403,070 | 4/1995 | Jahn et al. ............. 297/458 |

FOREIGN PATENT DOCUMENTS

| 484769 | 3/1970 | Germany . |
| 1206080 | 9/1970 | Germany . |
| 3110557 | 7/1982 | Germany . |
| 8331385 | 2/1984 | Germany . |
| 3319547 | 6/1984 | Germany . |
| 3316606 | 8/1984 | Germany . |
| 7839047 | 10/1985 | Germany . |
| 2183450 | 10/1987 | Germany . |

*Primary Examiner*—Lanna Mai
*Assistant Examiner*—Lynda Jasmin
*Attorney, Agent, or Firm*—Tarolli, Sundheim, Covell, Tummino & Szabo L.L.P.

[57] ABSTRACT

A belt buckle assembly has at least one traction cable secured to a belt buckle. The traction cable has two free ends and a middle portion connecting the free ends. The buckle assembly comprises an end piece attached to the traction cable for vehicle-fixed mounting of the traction cable, and a holding part surrounding the traction cable. The holding part is arranged between the end piece and the belt buckle, and holds the traction cable in a deflected position.

12 Claims, 1 Drawing Sheet

6,149,199

BELT BUCKLE WITH A TRACTION CABLE ATTACHED THERETO

TECHNICAL FIELD

The invention relates to a belt buckle with at least one traction cable secured thereto.

BACKGROUND OF THE INVENTION

A belt buckle must be arranged in the vehicle so that introducing the insert tongue into the belt buckle is optimally facilitated for vehicle occupants, this being the reason why the belt buckle needs to be located for optimum ergonomy. For this purpose, it has hitherto been necessary in part for the actual traction cable extending linearly between the belt buckle and the end piece to be kinked in the vicinity of the belt buckle to alter the position of the belt buckle. However, kinking may result in damage to the traction cable.

BRIEF SUMMARY OF THE INVENTION

The belt buckle in accordance with the invention comprises a traction cable which can be simply deflected without the risk of the traction cable being damaged. The belt buckle according to the invention has at least one traction cable secured thereto. The traction cable has two free ends and a middle portion connecting the free ends. The buckle comprises an end piece attached to the traction cable for vehicle-fixed mounting of the traction cable, and a holding part surrounding the traction cable. The holding part is arranged between the end piece and the belt buckle, and holds the traction cable in a deflected position. Without said holding part the cable extends linear between the belt buckle and the end piece. The holding part is secured exclusively to the traction cable and represents a part which is cheap and simple to fabricate.

The free ends of the traction cable are connected to each other by a common end piece which is usually pressed onto said ends. The holding part is preferably a sleeve surrounding the cable or, when the cable is looped resulting in two cable portions extending between the belt buckle and the end piece, surrounding at least one cable portion. This sleeve may be pressed onto the cable or onto the cable portion.

In a particularly simple embodiment the sleeve receives both cable portions and maintains them in the position assumed relative to each other in the deflected position.

It is, however, not a mandatory requirement that the holding part is pressed on the traction cable. Another possibility of deflecting the traction cable consists of the holding part comprising a curved duct receiving the traction cable or a cable portion, thereby deflecting the traction cable as a whole.

DETAILED DESCRIPTION OF PREFERRED EMBODIMENTS

Figure 1:
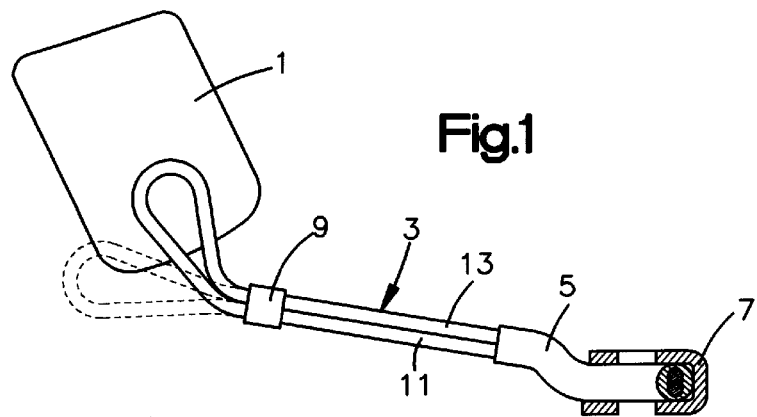
FIG. 1 is a side view of a first embodiment of the belt buckle according to the invention including the traction cable secured thereto.

In FIG. 1 a belt buckle having a traction cable 3 secured thereto is shown. The traction cable is bent into a loop, the free ends being connected to each other by the end piece 5 being pressed on the free ends of the traction cable 3. The end piece 5 is partly surrounded by a fitting part 7 with which the traction cable is fitted to the vehicle. Between the belt buckle 1 and the end piece 5 a holding part 9 is provided in the vicinity of the belt buckle 1, this holding part pressing the two cable portions 11, 13 of the traction cable to each other. To endow the belt buckle with a desired position oriented inclined upwards, the belt buckle is first brought into the desired position as shown. Subsequently, the holding part 9 is pressed onto the two cable portions 11, 13 so that the position of the cable portions 11, 13 is defined relative to each other and the traction cable 3 is no longer able to return to its starting position as depicted by the broken lines. This action does not result in the traction cable 3 being damaged. The holding part 9 is configured as a slotted sleeve.

Figure 2:
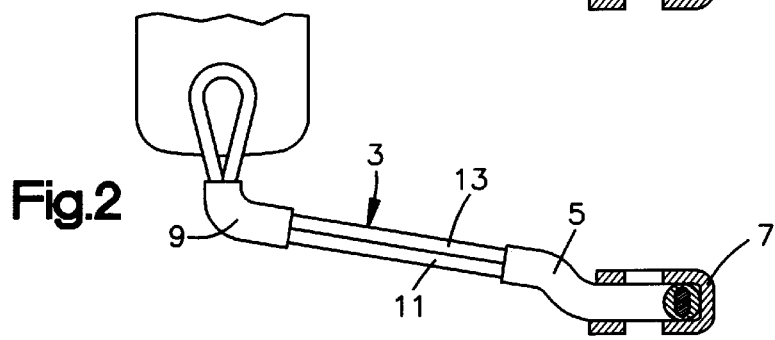
FIG. 2 shows a first embodiment of the belt buckle assembly according to the invention.

In FIG. 2 a belt buckle assembly is shown provided with two belt buckles, of which only the front one is evident from FIG. 2. The two belt buckles are connected to each other by a common traction cable 3 having two loops to each of which a belt buckle is secured. The loops are formed by the free ends of the traction cable being connected by an end piece to a middle portion of the traction cable. One such belt buckle assembly is provided in the rear of the vehicle, for example.

The principle of deflecting the cable by providing a holding part, as shown in FIG. 1, may also be applied to the belt buckle assembly, however, it likewise being of course just as possible to apply the holding part embodiments illustrated in the FIGS. 2 to 5 to only one belt buckle having a traction cable. In the embodiment shown in FIG. 2, a sleeve is provided for each loop, whereby, as compared to the sleeve shown in FIG. 1, each sleeve is simply longer and additionally bent, as a result of which the traction cable in the vicinity of the belt buckle can be deflected even more than is the case of the embodiment shown in FIG. 1.

Figure 3:
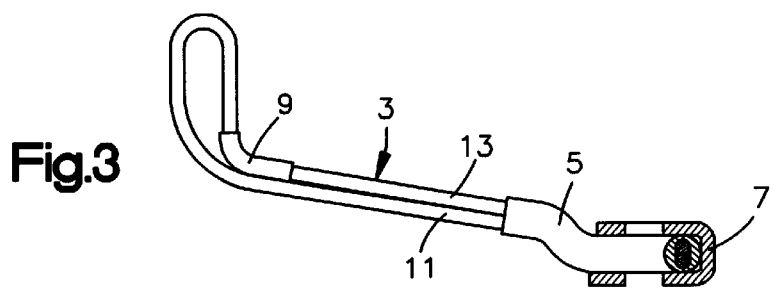
FIG. 3 shows a second embodiment of the belt buckle assembly.

The holding part 9 must not necessarily clamp both cable portions 11, 13 or connect them to each other, as is shown in FIG. 3. In this embodiment the holding part 9 is simply a sleeve surrounding exclusively the cable portion 13, this sleeve being able to grasp the cable portion 13 with a relatively low clamping force.

Figure 4:
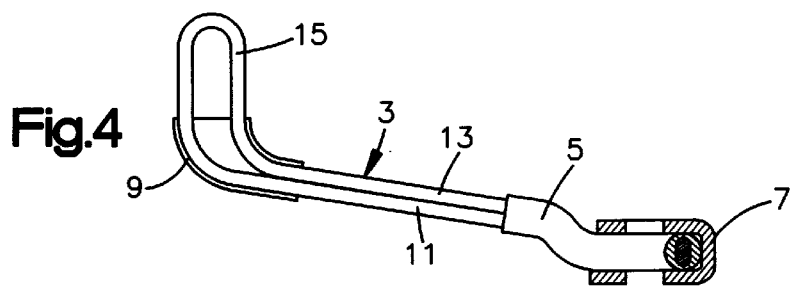
FIG. 4 shows a third embodiment of the belt buckle assembly, the belt buckles no longer being depicted explicitly in the FIGS. 3 and 4.
Figure 5:
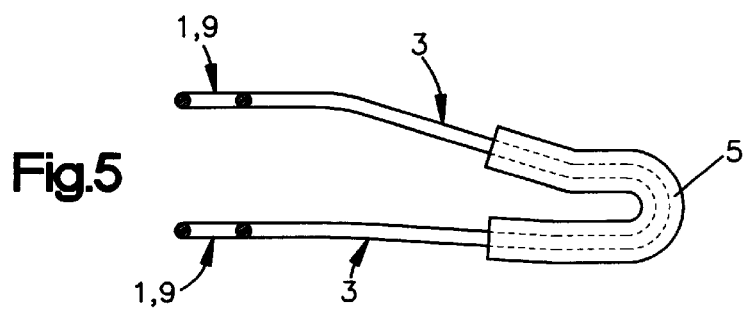
FIG. 5 is a common plan view of the common traction cable together with the end piece and the holding parts according to FIGS. 2 to 4.

In the case of the embodiment shown in FIG. 4, the traction cable 3 is not clamped in the holding part 9, instead the deflection is achieved by two curved ducts being provided in the interior of the holding part 9, each of these ducts receiving and deflecting a cable portion 11, 13. Consequently, the cable portions 11, 13 are also spaced away from each other in the region of the loop 15. In this embodiment each holding part 9 consists of two combinable individual parts of which only the rear one is shown. The two individual parts can be secured to each other by a clip connection not indicated in more detail. Fitting the holding part 9 is done after the assigned belt buckle 1 has been brought into the desired final position, as a result of which the cable portions assigned thereto are bent. Subsequently the individual parts supplementing each other to become a holding part in each case are brought into place on the cable portions 11, 13 and are pressed together so that the traction cable 3 remains in the desired deflected position.

As evident from the FIGS. 2 to 5, the end piece is bent U-shaped and is surrounded by the fitting part 7.

We claim:

1. A belt buckle assembly, with at least one belt buckle and with at least one traction cable secured to said belt buckle, said traction cable having two free ends and a middle portion connecting said free ends, with an end piece attached to said traction cable for vehicle-fixed mounting of said traction cable, with a holding part surrounding said traction cable, said holding part being arranged between said end piece and said belt buckle in the vicinity of said belt buckle, said traction cable having two sections, the first section extending between said end piece and said holding part and the second section extending between said holding part and said belt buckle, said belt buckle being secured to said second section, said first section of said traction cable extending in a first direction, and said holding part deflecting said second section in a second direction different from said first direction into a substantially upright position.

2. The belt buckle assembly as set forth in claim 1, wherein said holding part extends over a short axial distance between said belt buckle and said end piece, and said holding part is bent transversely to its longitudinal extent.

3. The belt buckle assembly as set forth in claim 1, wherein both free ends of said traction cable are connected to each other by said end piece pressed onto said ends to form a loop.

4. The belt buckle assembly as set forth in claim 3, wherein said loop comprises two cable portions, and wherein said holding part grasps said cable portions formed by said loop and maintains them in their assumed position relatively to each other in the deflected position.

5. The belt buckle assembly as set forth in claim 3, wherein said loop forms two cable portions and said holding part is a sleeve pressed onto one cable portion of said traction cable.

6. The belt buckle assembly as set forth in claim 3, wherein said loop forms two cable portions and wherein said holding part is a sleeve and said sleeve surrounds and clamps both cable portions.

7. The belt buckle assembly as set forth in claim 1, wherein said holding part is a sleeve pressed onto said traction cable.

8. The belt buckle assembly as set forth in claim 1, wherein said ends of said traction cable are connected to form a loop, said loop is defined by two cable portions, and wherein said holding part comprises at least one curved duct receiving at least one of said two cable portions formed by said loop.

9. The belt buckle assembly as set forth in claim 1, wherein said holding part includes two individual parts connectable to each other, said individual parts receiving between them said traction cable.

10. The belt buckle assembly as set forth in claim 9, wherein said individual parts are secured to each other by a clip connection.

11. A belt buckle assembly as set forth in claim 1, including two belt buckles, wherein a common traction cable forming two loops to each of which one belt buckle is secured, is provided, said belt buckle assembly,further provides a common end piece connecting said free ends and said middle portion of said traction cable, and provides at least one holding part assigned to each belt buckle.

12. A belt buckle assembly, with at least one belt buckle and at least one traction cable secured to said belt buckle, said traction cable having two free ends and a middle portion connecting said free ends, with an end piece attached to said traction cable for vehicle-fixed mounting of said traction cable, with a holding part surrounding said traction cable, said holding part being arranged between said end piece and said belt buckle in the vicinity of said belt buckle, said traction cable forming at least one loop, said loop having a first and a second section, said first section extending between said end piece and said holding part in a first direction, and said second section extending between said holding part and said belt buckle, said belt buckle being secured to said second section, said holding part deflecting said second section in a second direction different from said first direction into a substantially upright position.

* * * * *

UNITED STATES PATENT AND TRADEMARK OFFICE
CERTIFICATE OF CORRECTION

PATENT NO. : 6,149,199
DATED : November 21, 2000
INVENTOR(S) : Herbert Feile et al.

It is certified that error appears in the above-identified patent and that said Letters Patent is hereby corrected as shown below:

<u>Columns 3 and 4,</u>
Replace claims 1-12 with the following claims 1-12:

1. A belt buckle assembly comprising:
    at least two belt buckles;
    a common traction cable forming two loops, one belt buckle being secured to each loop;
    said traction cable having two free ends and a middle portion connecting said free ends
    said belt buckle assembly further including a common end piece connecting said free ends and said middle portion of traction cable;
    said end piece being attached to said traction cable for vehicle-fixed mounting of said traction cable;
    at least two holding parts surrounding said traction cable, said holding parts being arranged between said end piece and said belt buckle in the vicinity of said belt buckle, at least one holding part being assigned to each belt buckle;
    each loop of said traction cable having two sections, the first section extending between said end piece and said holding part and the second section extending between said holding part and said belt buckle, said belt buckle being secured to said second section;
    said first section of said traction cable extending in a first direction; and
    said holding part deflecting said second section in a second direction different from said first direction into a substantially upright position.
2. The belt buckle assembly as set forth in claim 1, wherein said holding part extends over a short axial distance between said belt buckle and said end piece, and said holding part is bent transversely to its longitudinal extent.
3. The belt buckle assembly as set forth in claim 1, wherein said end piece is pressed onto said free ends to form said loops.
4. The belt buckle assembly as set forth in claim 3, wherein at least one of said loops comprises two cable portions, and wherein at least one of said holdings parts grasps said cable portions formed by said loop and maintains them in an assumed position relatively to each other in a deflected position.
5. The belt buckle assembly as set forth in claim 3, wherein at least one of said loops forms two cable portions and at least one of said holding parts is a sleeve pressed onto one cable portion of said traction cable.
6. The belt buckle assembly as set forth in claim 1, wherein said holding part is a sleeve pressed onto said traction cable.
7. The belt buckle assembly as set forth in claim 3, wherein at least one of said loops forms two cable portions and wherein at least one of said holding parts is a sleeve and said sleeve surrounds and clamps both cable portions.

UNITED STATES PATENT AND TRADEMARK OFFICE
CERTIFICATE OF CORRECTION

PATENT NO. : 6,149,199
DATED : November 21, 2000
INVENTOR(S) : Herbert Feile et al.

It is certified that error appears in the above-identified patent and that said Letters Patent is hereby corrected as shown below:

8. The belt buckle assembly as set forth in claim 1, wherein at least one of said loops is defined by two cable portions, and wherein at least one of said holding parts comprises at least one curved duct receiving at least one of said two cable portions formed by said loop.

9. The belt buckle assembly as set forth in claim 1, wherein said holding part includes two individual parts connectable to each other, said individual parts receiving between them said traction cable.

10. The belt buckle assembly as set forth in claim 9, wherein said individual parts are secured to each other by a clip connection.

11. A belt buckle assembly comprising:
   at least one belt buckle;
   at least one traction cable secured to said belt buckle;
   said traction cable having two free ends and a middle portion connecting said free ends;
   an end piece attached to said traction cable for vehicle-fixed mounting of said traction cable;
   a holding part surrounding said traction cable;
   said holding part being arranged between said end piece and said belt buckle in the vicinity of said belt buckle;
   said traction cable forming at least one loop having two cable portions;
   said loop having a first and a second section, said first section extending between said end piece and said holding part in a first direction, said second section extending between said holding part and said belt buckle, said belt buckle being secured to said section;
   said holding part deflecting said second section in a second direction different from said first direction into a substantially upright position;
   said holding part being a non-curved sleeve which extends over a short axial distance between said belt buckle and said end piece; and
   said holding part being pressed onto said two cable portions so that the position of the cable portions relative to each other is maintained and the second section is maintained deflected in the second direction.

UNITED STATES PATENT AND TRADEMARK OFFICE
CERTIFICATE OF CORRECTION

PATENT NO. : 6,149,199
DATED : November 21, 2000
INVENTOR(S) : Herbert Feile et al.

It is certified that error appears in the above-identified patent and that said Letters Patent is hereby corrected as shown below:

12. The belt buckle assembly as set forth in claim 11, wherein said holding part presses said two cable portions against each other.

Signed and Sealed this

Thirtieth Day of April, 2002

Attest:

Attesting Officer

JAMES E. ROGAN
*Director of the United States Patent and Trademark Office*